US011941357B2

(12) United States Patent
Roy et al.

(10) Patent No.: US 11,941,357 B2
(45) Date of Patent: Mar. 26, 2024

(54) MACHINE LEARNING TECHNIQUES FOR WORD-BASED TEXT SIMILARITY DETERMINATIONS

(71) Applicant: Optum Technology, Inc., Eden Prairie, MN (US)

(72) Inventors: Suman Roy, Bangalore (IN); Amit Kumar, Gaya (IN); Sourabh Kumar Bhattacharjee, New Delhi (IN); Shashi Kumar, Bengaluru (IN); William Scott Paka, New Delhi (IN); Tanmoy Chakraborty, New Delhi (IN)

(73) Assignee: OPTUM TECHNOLOGY, INC., Eden Prairie, MN (US)

( * ) Notice: Subject to any disclaimer, the term of this patent is extended or adjusted under 35 U.S.C. 154(b) by 207 days.

(21) Appl. No.: 17/355,731

(22) Filed: Jun. 23, 2021

(65) Prior Publication Data

US 2022/0414330 A1    Dec. 29, 2022

(51) Int. Cl.
G06F 40/279    (2020.01)
G06F 18/2113   (2023.01)
G06F 18/22     (2023.01)
G06F 40/137    (2020.01)
G06V 30/414    (2022.01)

(52) U.S. Cl.
CPC ........ *G06F 40/279* (2020.01); *G06F 18/2113* (2023.01); *G06F 18/22* (2023.01); *G06F 40/137* (2020.01); *G06V 30/414* (2022.01)

(58) Field of Classification Search
CPC .... G06F 40/279; G06F 18/2113; G06F 18/22; G06F 40/137; G06V 30/414; G06N 20/00
See application file for complete search history.

(56) References Cited

U.S. PATENT DOCUMENTS

| | | | |
|---|---|---|---|
| 6,301,577 B1 | 10/2001 | Matsumoto et al. | |
| 7,203,679 B2 | 4/2007 | Agrawal et al. | |
| 7,610,192 B1 | 10/2009 | Jamieson | |
| 7,844,595 B2 | 11/2010 | Canright et al. | |
| 8,402,030 B1 * | 3/2013 | Pyle ..................... | G06F 16/334 |
| | | | 707/738 |
| 8,719,197 B2 | 5/2014 | Schmidtler et al. | |

(Continued)

FOREIGN PATENT DOCUMENTS

| | | |
|---|---|---|
| CN | 109635109 A | 4/2019 |
| CN | 108733837 B | 4/2021 |

(Continued)

OTHER PUBLICATIONS

NonFinal Office Action for U.S. Appl. No. 16/930,862, dated Dec. 14, 2022, (29 pages), United States Patent and Trademark Office.

(Continued)

*Primary Examiner* — Santiago Garcia
(74) *Attorney, Agent, or Firm* — Alston & Bird LLP

(57) ABSTRACT

Various embodiments of the present invention provide methods, apparatus, systems, computing devices, computing entities, and/or the like for performing text similarity determination. Certain embodiments of the present invention utilize systems, methods, and computer program products that perform text similarity determination by using at least one of Word Mover's Similarity measures, Relaxed Word Mover's Similarity measures, and Related Relaxed Word Mover's Similarity measures.

20 Claims, 8 Drawing Sheets

(56) References Cited

U.S. PATENT DOCUMENTS

| | | | |
|---|---|---|---|
| 9,087,236 | B2 | 7/2015 | Dhoolia et al. |
| 9,171,057 | B2 | 10/2015 | Botros |
| 10,140,288 | B2* | 11/2018 | Pestian ............... G06F 40/253 |
| 10,152,648 | B2 | 12/2018 | Filimonova |
| 10,296,846 | B2 | 5/2019 | Csurka et al. |
| 10,667,794 | B2 | 6/2020 | Beymer et al. |
| 10,679,738 | B2 | 6/2020 | Ganesan et al. |
| 10,754,925 | B2 | 8/2020 | D'Souza et al. |
| 10,769,381 | B2 | 9/2020 | Tacchi et al. |
| 10,824,661 | B1 | 11/2020 | Huang et al. |
| 11,263,523 | B1 | 3/2022 | Duchon et al. |
| 11,379,665 | B1 | 7/2022 | Edmund et al. |
| 11,481,689 | B2 | 10/2022 | Dong et al. |
| 11,734,937 | B1 | 8/2023 | Pushkin et al. |
| 2008/0162455 | A1 | 7/2008 | Daga et al. |
| 2012/0185275 | A1 | 7/2012 | Loghmani |
| 2013/0031088 | A1* | 1/2013 | Srikrishna .......... G06F 16/3322 707/E17.014 |
| 2013/0254153 | A1 | 9/2013 | Marcheret |
| 2015/0066974 | A1 | 3/2015 | Winn |
| 2015/0227505 | A1 | 8/2015 | Morimoto |
| 2015/0286629 | A1 | 10/2015 | Abdel-Reheem et al. |
| 2016/0117589 | A1 | 4/2016 | Scholtes |
| 2016/0300020 | A1 | 10/2016 | Wetta et al. |
| 2017/0286869 | A1 | 10/2017 | Zarosim et al. |
| 2017/0337334 | A1 | 11/2017 | Stanczak et al. |
| 2018/0165554 | A1* | 6/2018 | Zhang ................ G06F 18/2411 |
| 2018/0349388 | A1 | 12/2018 | Skiles et al. |
| 2019/0065986 | A1 | 2/2019 | Witbrock et al. |
| 2019/0108175 | A1 | 4/2019 | Sevenster et al. |
| 2020/0125639 | A1 | 4/2020 | Doyle |
| 2020/0134506 | A1 | 4/2020 | Wang et al. |
| 2020/0202181 | A1 | 6/2020 | Yadav et al. |
| 2020/0312431 | A1 | 10/2020 | Zhang et al. |
| 2020/0327404 | A1 | 10/2020 | Miotto et al. |
| 2020/0334416 | A1* | 10/2020 | Vianu ................ G06V 10/764 |
| 2020/0356627 | A1 | 11/2020 | Pablo et al. |
| 2020/0364404 | A1 | 11/2020 | Priestas et al. |
| 2021/0034813 | A1 | 2/2021 | Wu et al. |
| 2021/0149937 | A1 | 5/2021 | Coulombe et al. |
| 2021/0157979 | A1 | 5/2021 | Sheide et al. |
| 2021/0335469 | A1 | 10/2021 | Xie et al. |
| 2021/0343410 | A1 | 11/2021 | Zhang et al. |
| 2021/0358601 | A1 | 11/2021 | Pillai et al. |
| 2022/0019741 | A1 | 1/2022 | Roy et al. |
| 2022/0121823 | A1 | 4/2022 | Lockett et al. |
| 2022/0139384 | A1 | 5/2022 | Wu et al. |
| 2022/0207536 | A1* | 6/2022 | Tian ................ G06Q 20/4014 |
| 2022/0318504 | A1* | 10/2022 | Malkiel .............. G06F 16/9538 |
| 2022/0368696 | A1* | 11/2022 | Karpovsky .......... H04L 63/1425 |
| 2023/0119402 | A1 | 4/2023 | Kumar et al. |
| 2023/0333518 | A1* | 10/2023 | Oi ........................ B25J 13/00 |

FOREIGN PATENT DOCUMENTS

| | | |
|---|---|---|
| EP | 3392780 A2 | 10/2018 |
| WO | 2021/252419 A1 | 12/2021 |
| WO | 2022/081812 A1 | 4/2022 |

OTHER PUBLICATIONS

Arumae, Kristjan et al., "CALM: Continuous Adaptive Learning for Language Modeling," arXiv:2004.03794v1 [cs.CL], Apr. 8, 2020, available online at https://arxiv.org/pdf/2004.03794.pdf.

Chen, Pei-Fu et al. Automatic ICD-10 Coding and Training System: Deep Neural Network Based on Supervised Learning, JMIR Medical Informatics, Aug. 31, 2021, vol. 9, No. 8:e23230, pp. 1-13.

Delvin, Jacob et al. "BERT: Pre-training of Deep Bidirectional Transformers for Language Understanding," NAACL-HLT (1), May 24, 2019, pp. 4171-4186, arXiv:1810.04805 [cs.CL], available online at https://arxiv.org/abs/1810.04805 (Year: 2019).

Goldstein, Ira et al. "Three Approaches to Automatic Assignment of ICD-9-CM Codes to Radiology Reports," AMIA Annual Symposium Proceedings Archive, Oct. 11, 2007, pp. 279-283, PMID: 18693842; PMCID: PMC2655861.

Kavuluru, Ramakanth et al. "Unsupervised Extraction of Diagnosis Codes from EMRs Using Knowledge-Based and Extractive Text Summarization Techniques," Advanced Artificial Intelligence, vol. 7884, May 2013, pp. 77-88, DOI: 10.1007/978-3-642-38457-8_7, PMCID: PMC5524149, PMID: 28748227.

Kusner, Matt J. et al. "From Word Embeddings to Document Distances," Proceedings of the 32nd International Conference on Machine Learning, vol. 37, (ICML'15), Jun. 1, 2015, pp. 957-966.

Mullenbach, James et al. "Explainable Prediction of Medical Codes from Clinical Text," arXiv preprint arXiv:1802.05695v2, Apr. 16, 2018, (11 pages).

Nigam, Priyanka. Applying Deep Learning to ICD-9 Multi-Label Classification From Medical Records. Technical Report, Stanford University, (Year: 2016), pp. 1-8, available online: http://cs224d.stanford.edu/reports/priyanka.pdf.

Xie, Pengtao et al. "A Neural Architecture for Automated ICD Coding," Proceedings of the 56th Annual Meeting of the Association for Computational Linguistics (Long Papers), vol. 1, Jul. 15-20, 2018, pp. 1066-1076.

Xu, Keyang et al. "Multimodal Machine Learning for Automated ICD Coding," Proceedings of Machine Learning Research, vol. 106, Oct. 28, 2019, pp. 1-18.

Zhang, Minghua et al. "Learning Universal Sentence Representations with Mean-Max Attention Autoencoder," arXiv preprint arXiv:1809.06590v1 [cs.CL], Sep. 18, 2018, (10 pages).

Atutxa, Aitziber et al. "Interpretable Deep Learning to Map Diagnostic Texts to ICD-10 Codes," International Journal of Medical Informatics, vol. 129, Sep. 2019, pp. 49-59.

Bai, Tian et al. "Improving Medical Code Prediction From Clinical Text Incorporating Online Knowledge Sources," in Proceedings of the 2019 World Wide Web Conference, pp. 72-82, May 13-17, 2019, San Francisco, CA, USA, DOI:10.1145/3308558.3313485.

Baumel, Ted et al. "Multi-Label Classification of Patient Notes: Case Study on ICD Code Assignment," in Workshops at the Thirty-Second AAAI Conference on Artificial Intelligence, Jun. 20, 2018, pp. 409-416.

Burgess, Curt et al. "Explorations in Context Space: Words, Sentences, Discourse," Discourse Processes, vol. 25, Nos. 2-3, (1998), pp. 211-257. DOI: 10.1080/01638539809545027.

Dharmadhikari, Shweta C. et al. "A Novel Multi Label Text Classification Model Using Semi Supervised Learning," International Journal of Data Mining & Knowledge Management Process (IJDKP), vol. 2, No. 4, Jul. 2021, pp. 11-20.

Huang, Gao et al. "Supervised Word Mover's Distance," in Advances in Neural Information Processing Systems, (2016), pp. 4862-4870.

Islam, Aminul et al. "Semantic Text Similarity Using Corpus-Based Word Similarity and String Similarity," ACM Transactions on Knowledge Discovery from Data (TKDD), Issue 2, No. 2, Article 10, Jul. 2008, pp. 10:1-10:25.

Kavuluru, Ramakanth et al. "Unsupervised Extraction of Diagnosis Codes from EMRs Using Knowledge-Based and Extractive Text Summarization Techniques," Advancement of Artificial Intelligence, vol. 2013, May 2013, pp. 77-88, DOI: 10.1007/978-3-642-38457-8_7, PMCID: PMC552414, NIHMSID: NIHMS877790, PMID: 28748227.

Kusner, Matt J. et al. "From Word Embeddings to Document Distances," in Proceedings of the 32nd International Conference on Machine Learning, Jun. 1, 2015, (10 pages).

Landauer, Thomas K. et al. "An Introduction to Latent Semantic Analysis," Discourse Processes, (1998), vol. 25, pp. 259-284.

Li, Yuhua et al. "Sentence Similarity Based on Semantic Nets and Corpus Statistics," IEEE Transactions on Knowledge and Data Engineering, vol. 18, No. 8, Jun. 26, 2006, pp. 1-35).

Liu, Bing et al. "Text Classification by Labeling Words," American Association for Artificial Intelligence, Jul. 25, 2004, vol. 4, (6 pages).

Mikolov, Tomas et al. "Distributed Representations of Words and Phrases and Their Compositionality," in Advances in Neural Information Processing Systems, (2013) pp. 1-9.

(56) References Cited

OTHER PUBLICATIONS

Mullenbach, James et al. "Explainable Prediction of Medical Codes From Clinical Text," arXiv:1802.056952v2 [cs.CL] Apr. 16, 2018, (11 pages).

Okazaki, Naoaki et al. "Sentence Extraction by Spreading Activation Through Sentence Similarity," IEICE Transactions Information and Systems, vol. E82, No. 1, Jan. 1999, pp. 1-9.

Patel, Kevin et al. "Adapting Pre-Trained Word Embeddings for Use in Medical Coding," in Biomedical Natural Language Processing Workshop (BioNLP 2017), Aug. 2017, (5 pages).

Saxena, Nihit. "Word Mover's Distance for Text Similarity," Aug. 26, 2019, (8 pages), [Article, Online]. [Retrieved from the Internet Oct. 15, 2020]<URL: https://towardsdatascience.com/word-movers-distance-for-text-similarity-7492aeca71b0>.

Scheurwegs, Elyne et al. "Assigning Clinical Codes With Data Driven Concept Representation on Dutch Clinical Free Text," Journal of Biomedical Informatics, vol. 69, Apr. 8, 2017, pp. 118-127, DOI: 10.1016/j.jbi.2017.04.007.

Sonabend, W. Aaron et al. "Automated ICD Coding Via Unsupervised Knowledge Integration (UNITE)," International Journal of Medical Informatics, vol. 139, Jul. 2020, pp. 104135, ISSN: 1386-5056.

Werner, Matheus et al. "Speeding Up Word Mover's Distance and Its Variants via Properties of Distances Between Embeddings," arXiv:1912.005092v2 [cs.CL] May 8, 2020, (8 pages).

Xie, Pengtao et al. "A Neural Architecture for Automated ICD Coding," Proceedings of the 56th Annual Meeting of the Association for Computational Linguistics (Long Papers), pp. 1066-1076, Jul. 15-20, 2018, Melbourne Australia.

Xu, Keyang et al. "Multimodal Machine Learning for Automated ICD Coding," Proceedings of Machine Learning Research, vol. 106, (18 pages), Oct. 28, 2019, PMLR.

Zhang, Minghua et al. "An Unsupervised Model With Attention Autoencoders for Question Retrieval," The Thirty-Second AAAI Conference on Artificial Intelligence (AAAI-18), vol. 32, No. 1, Apr. 26, 2018, pp. 4978-4986.

Cover, Thomas M. et al. "Elements of Information Theory," John Wiley & Sons, Inc., (565 pages), (Year: 1991), Print ISBN: 0-471-06259-6, Online ISBN: 0-471-20061-1.

Goldstein, Ira et al. "Three Approaches to Automatic Assignment of ICD-9-CM Codes to Radiology Reports," AMIA Annual Symposium Proceedings Archive, Oct. 11, 2007, pp. 279-283. PMID: 18693842; PMCID: PMC2655861, available online: https://www.ncbi.nlm.nih.gov/pmc/articles/PMC2655861/.

Hager, Gregory E. et al. "Multiple Kernel Tracking With SSD," in Proceedings of the 2004 IEEE Computer Society Conference on Computer Vision and Pattern Recognition, vol. 1, pp. I-790-I-797, Jun. 27, 2004, (Year: 2004), CVPR 2004, IEEE.

Kailath, Thomas. "The Divergence and Bhattacharyya Distance Measures in Signal Selection," IEEE Transactions on Communication Technology, vol. COM-15, No. 1, Feb. 1967, pp. 52-60.

Kumar, Amit et al. "A Fast Unsupervised Assignment of ICD Codes With Clinical Notes Through Explanations," SAC '22: Proceedings of the 37th ACM/SIGAPP Symposium on Applied Computing, Apr. 2022, pp. 610-618, available online at: https://doi.org/10.1145/3477314.3506983.

Niblack, W. et al. "QBIC Project: Querying Images by Content, Using Color, Texture, and Shape," in Storage and Retrieval for Image and Video Databases, SPIE vol. 1908, pp. 173-187, Apr. 14, 1993.

Puzicha, Jan et al. "Non-Parametric Similarity Measures for Unsupervised Texture Segmentation and Image Retrieval," in Proceedings / CVPR, IEEE Computer Society Conference on Computer Vision and Pattern Recognition, Jul. 1997, pp. 267-272, DOI: 10.1109/CVPR.1997.609331.

Rubner, Yossi. "Perceptual Metrics for Image Database Navigation," PhD Dissertation, Stanford University, May 1999, (177 pages).

Shuai, Zhao et al. "Comparison of Different Feature Extraction Methods for Applicable Automated ICD Coding," BMC Medical Informatics and Decision Making, vol. 22, No. 11, pp. 1-15, Dec. 2022, DOI: 10.1186/s12911-022-01753-5.

Singaravelan, Anandakumar et al. "Predicting ICD-9 Codes Using Self-Report of Patients," Applied Sciences, vol. 11, No. 21:10046, pp. 1-18, Oct. 17, 2021, DOI: 10.3390/app112110046.

Swain, Michael J. et al. "Color Indexing," International Journal of Computer Vision, vol. 7, No. 1, (Year: 1991), pp. 11-32.

Tang, Xiangru et al. "CONFIT: Toward Faithful Dialogue Summarization With Linguistically-Informed Contrastive Fine-Tuning," arXiv: 2112.08713v1 [cs.CL] Dec. 16, 2021, (11 pages), available online at https://arxiv.org/pdf/2112.08713v1.pdf.

Werman, Michael et al. "A Distance Metric for Multi-Dimensional Histograms," Computer, Vision, Graphics, and Image Processing, vol. 32, pp. 328-336, (Year: 1985), available online at http://w3.cs.huji.ac.il/~peleg/papers/cvgip85-Distance.pdf.

Zhao, Qi et al. "Differential Earth Mover's Distance with Its Applications to Visual Tracking," IEEE Transactions on Pattern Analysis and Machine Intelligence, vol. 32, No. 2, Dec. 31, 2008, pp. 274-287.

Final Office Action for U.S. Appl. No. 16/930,862, dated Jun. 21, 2023, (28 pages), United States Patent and Trademark Office, US.

Bittencourt, Marciele M. et al. "ML-MDL Text: A Multi label Text Categorization Technique With Incremental Learning", 2019 8th Brazilian Conference on Intelligent Systems (BRACIS). Oct. 15-18, 2019, pp. 580-585, DOI: 10.1109/BRACIS.2019.00107.

Jiang, Shuo et al. "Deep Learning for Technical Document Classification", IEEE Transactions on Engineering Management, vol. PP, Issue 99, Mar. 8, 2022, pp. 1-17, DOI: 10.1109/TEM.2022.3152216.

NonFinal Office Action for U.S. Appl. No. 17/808,223, dated Sep. 28, 2023, (29 pages), United States Patent and Trademark Office, US.

Wei, Guiying et al. "Study of Text Classification Methods for Data Sets With Huge Features", 2010 2nd International Conference on Industrial and Information Systems, vol. 1, pp. 433-436, Jul. 10-11, 2010, DOI: 10.1109/INDUSIS.2010.5565817.

Advisory Action for U.S. Appl. No. 16/930,862, dated Oct. 25, 2023, (3 pages), United States Patent and Trademark Office, U.S.

NonFinal Office Action for U.S. Appl. No. 16/930,862, dated Dec. 5, 2023, (29 pages), United States Patent and Trademark Office, U.S.

* cited by examiner

601 d: Febrile Urinary Tract Infection evaluate for possible reflux with whom ...

602 q: Other disorders of urethra and urinary tract

Similarity value ≈ 0.9

603 cos_sim = cosine similarity between two word embedding cos_sim(disorders, infection) = 0.7
cos_sim(urethra, urinary) = 0.8
cos_sim(urinary, urinary) = 1.0
cos_sim(tract, tract) = 1.0

604 $f_i$ = weight of $word_i$ in the list of Key-phrases
= $tf\text{-}idf(w_i, q)/\Sigma_j tf\text{-}idf(w_j, q)$ $f_{disorders}$ = 0.15
$f_{urethra}$ = 0.25
$f_{urinary}$ = 0.30
$f_{tract}$ = 0.30

605 Similarity between two sentences = Word Mover Similarity (WMS)
= $\Sigma_{i=1}^{m} \Sigma_{j=1}^{n} f_{ij} * s(i,j)$
= 0.15 * 0.7 + 0.25 * 0.8 + 0.3 * 1.0 + 0.3 * 1.0
= 0.905
≈ 0.9

FIG. 6

| clinical text | Labelled ICD Code |
|---|---|
| 701 pulmonary alveolar proteinosis hypoxic respiratory failure leading to death discharge condition death discharge instructions death follow up instructions none initials last name name md md md number | ['5187', '3485', '51881', '486', '34510', 'V641', '2767'] |
| 702 hematemesis vomiting blood acute renal failure pneumonia secondary diagnosis alcohol abuse depression schizoaffective disorder discharge condition improved discharge instructions you were admitted to the hospital for treatment of vomiting blood and urinary problems. name ril were found to have bleeding in your gastrointestinal tract and this improved with medications. for your urinary problems you were found to have acute renal failure likely due to vomiting dehydration and muscle damage your kidney function improved with rehydration. you also developed a fever and pneumonia which improved with antibiotics. | ['53021', '27651', '311', '30301', '29570'] |

FIG. 7

Code Hierarchy 1

MACHINE LEARNING TECHNIQUES FOR WORD-BASED TEXT SIMILARITY DETERMINATIONS

BACKGROUND

Various embodiments of the present invention address technical challenges related to performing natural language processing and provide solutions to address the efficiency and reliability shortcomings of existing natural language processing solutions.

BRIEF SUMMARY

In general, various embodiments of the present invention provide methods, apparatus, systems, computing devices, computing entities, and/or the like for performing text similarity determination. Certain embodiments of the present invention utilize systems, methods, and computer program products that perform text similarity determination by using at least one of Word Mover's Similarity measures, Relaxed Word Mover's Similarity measures, and Related Relaxed Word Mover's Similarity measures.

In accordance with one aspect, a method is provided. In one embodiment, the method comprises: generating a maximal word similarity score for a reference text data object and a target text data object, wherein: (i) the maximal word similarity score describes a maximal value of a transition cost value associated with one or more reference words of the reference text data object and one or more target words of the target data object, and (ii) the transition cost value is determined based at least in part on: (a) a word-wise flow data object for the reference text data object and the target text data object that describes, for each word pair comprising a reference word and a target word, a word-wise flow value, and (b) for each word pair, a word-wise similarity value; generating a predicted similarity score based at least in part on the maximal word similarity score; and performing one or more prediction-based actions based at least in part on the predicted similarity score.

In accordance with another aspect, a computer program product is provided. The computer program product may comprise at least one computer-readable storage medium having computer-readable program code portions stored therein, the computer-readable program code portions comprising executable portions configured to: generate a maximal word similarity score for a reference text data object and a target text data object, wherein: (i) the maximal word similarity score describes a maximal value of a transition cost value associated with one or more reference words of the reference text data object and one or more target words of the target data object, and (ii) the transition cost value is determined based at least in part on: (a) a word-wise flow data object for the reference text data object and the target text data object that describes, for each word pair comprising a reference word and a target word, a word-wise flow value, and (b) for each word pair, a word-wise similarity value; generate a predicted similarity score based at least in part on the maximal word similarity score; and perform one or more prediction-based actions based at least in part on the predicted similarity score.

In accordance with yet another aspect, an apparatus comprising at least one processor and at least one memory including computer program code is provided. In one embodiment, the at least one memory and the computer program code may be configured to, with the processor, cause the apparatus to: generate a maximal word similarity score for a reference text data object and a target text data object, wherein: (i) the maximal word similarity score describes a maximal value of a transition cost value associated with one or more reference words of the reference text data object and one or more target words of the target data object, and (ii) the transition cost value is determined based at least in part on: (a) a word-wise flow data object for the reference text data object and the target text data object that describes, for each word pair comprising a reference word and a target word, a word-wise flow value, and (b) for each word pair, a word-wise similarity value; generate a predicted similarity score based at least in part on the maximal word similarity score; and perform one or more prediction-based actions based at least in part on the predicted similarity score.

BRIEF DESCRIPTION OF THE DRAWINGS

Figure 1:
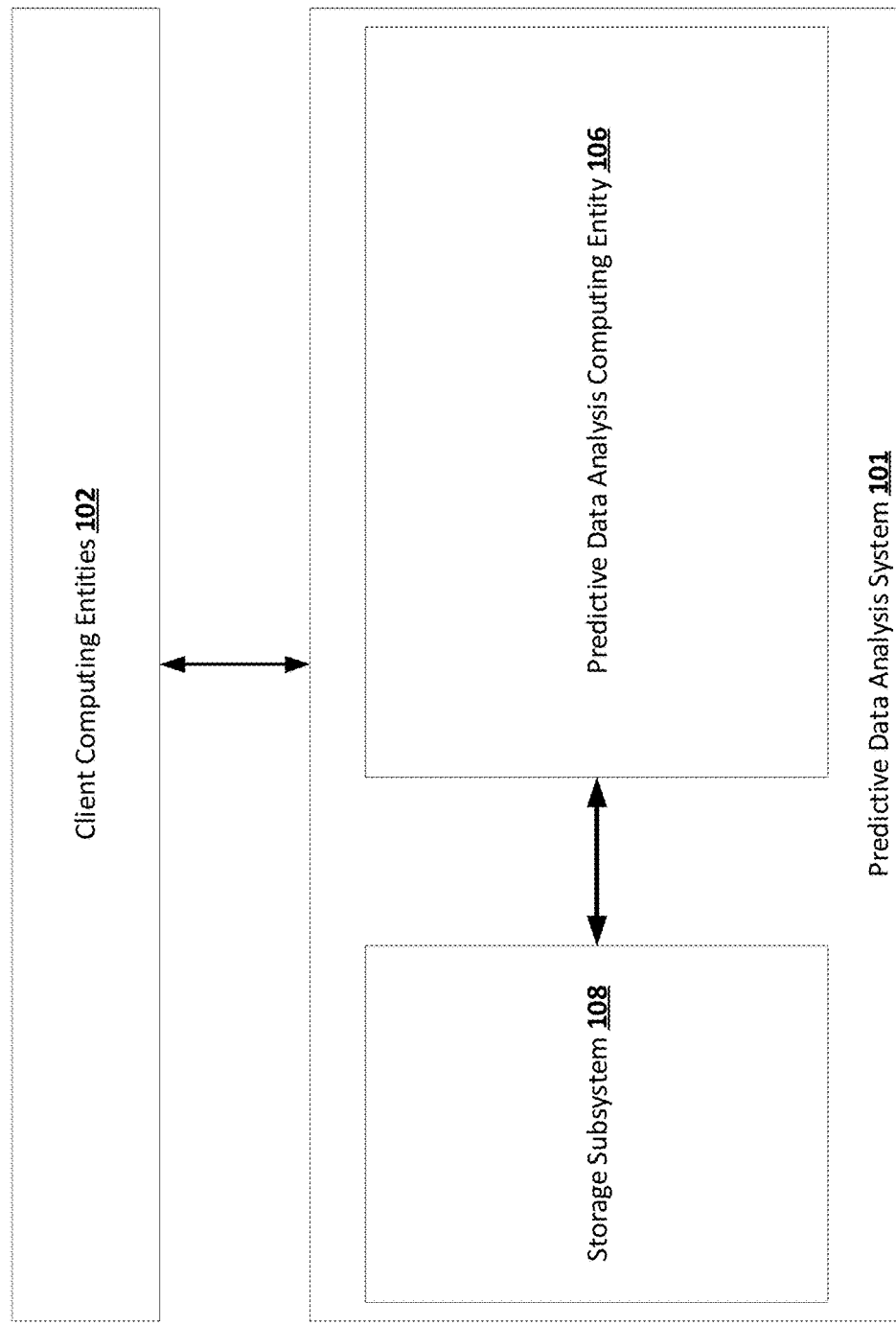

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
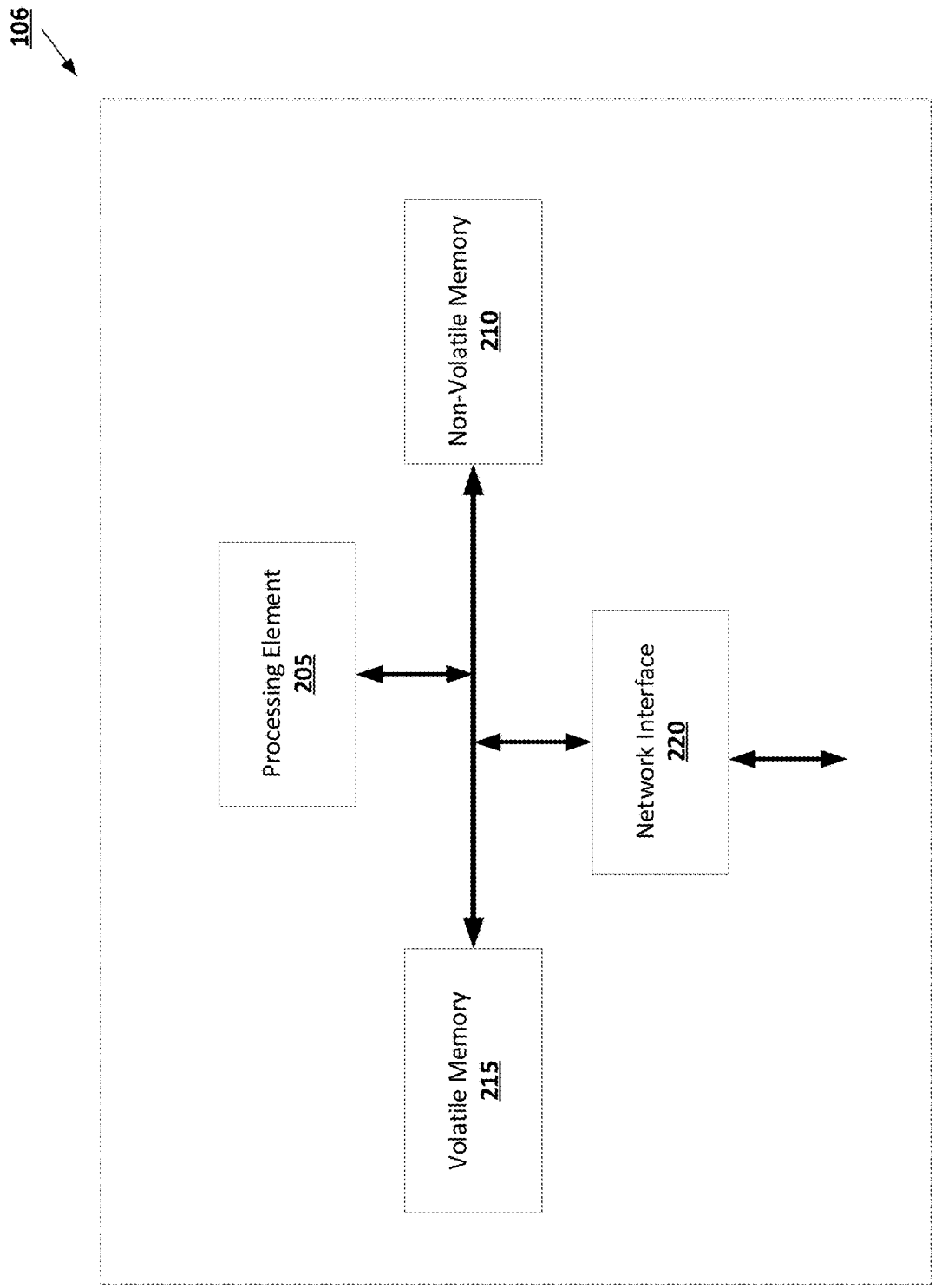

FIG. 2 provides an example predictive data analysis computing entity in accordance with some embodiments discussed herein.

Figure 3:
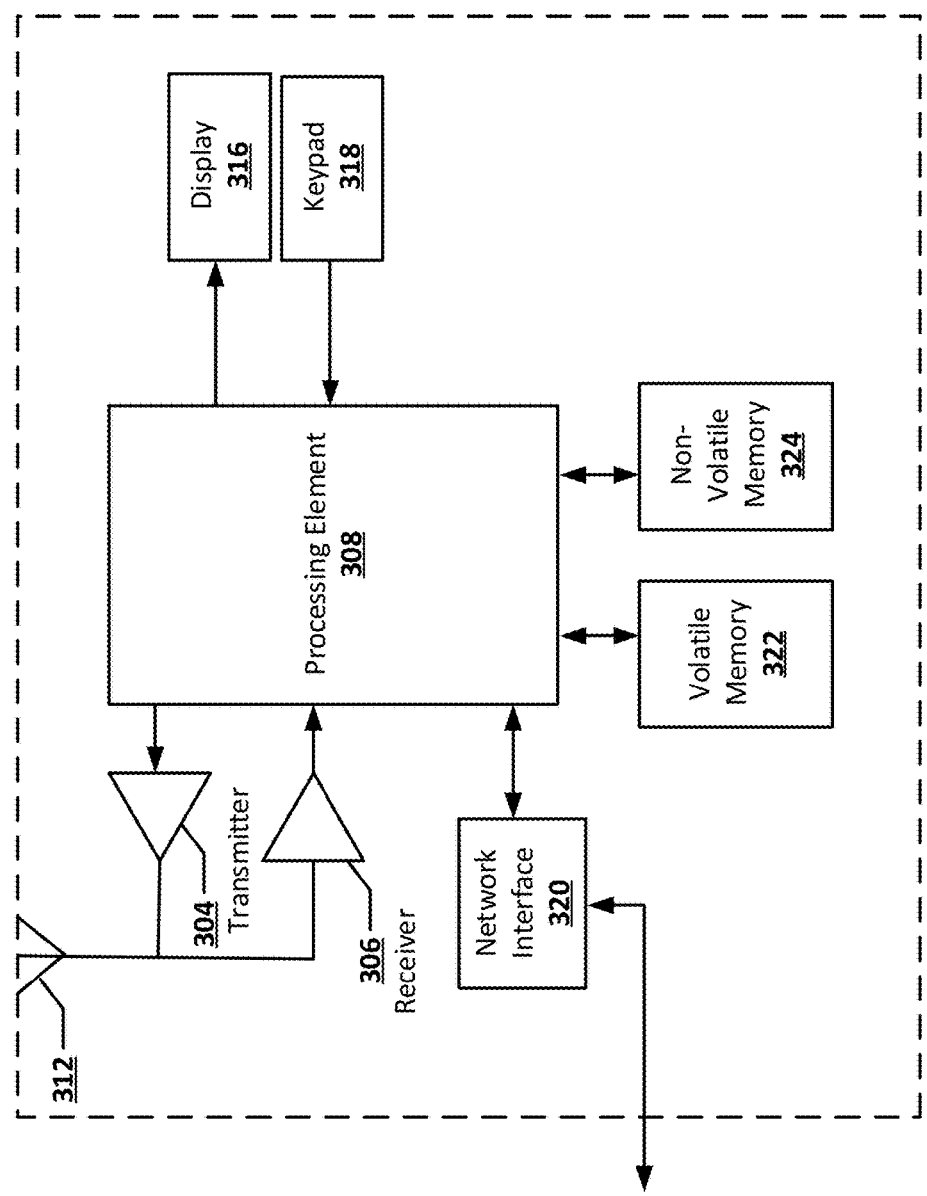

FIG. 3 provides an example client computing entity in accordance with some embodiments discussed herein.

Figure 4:
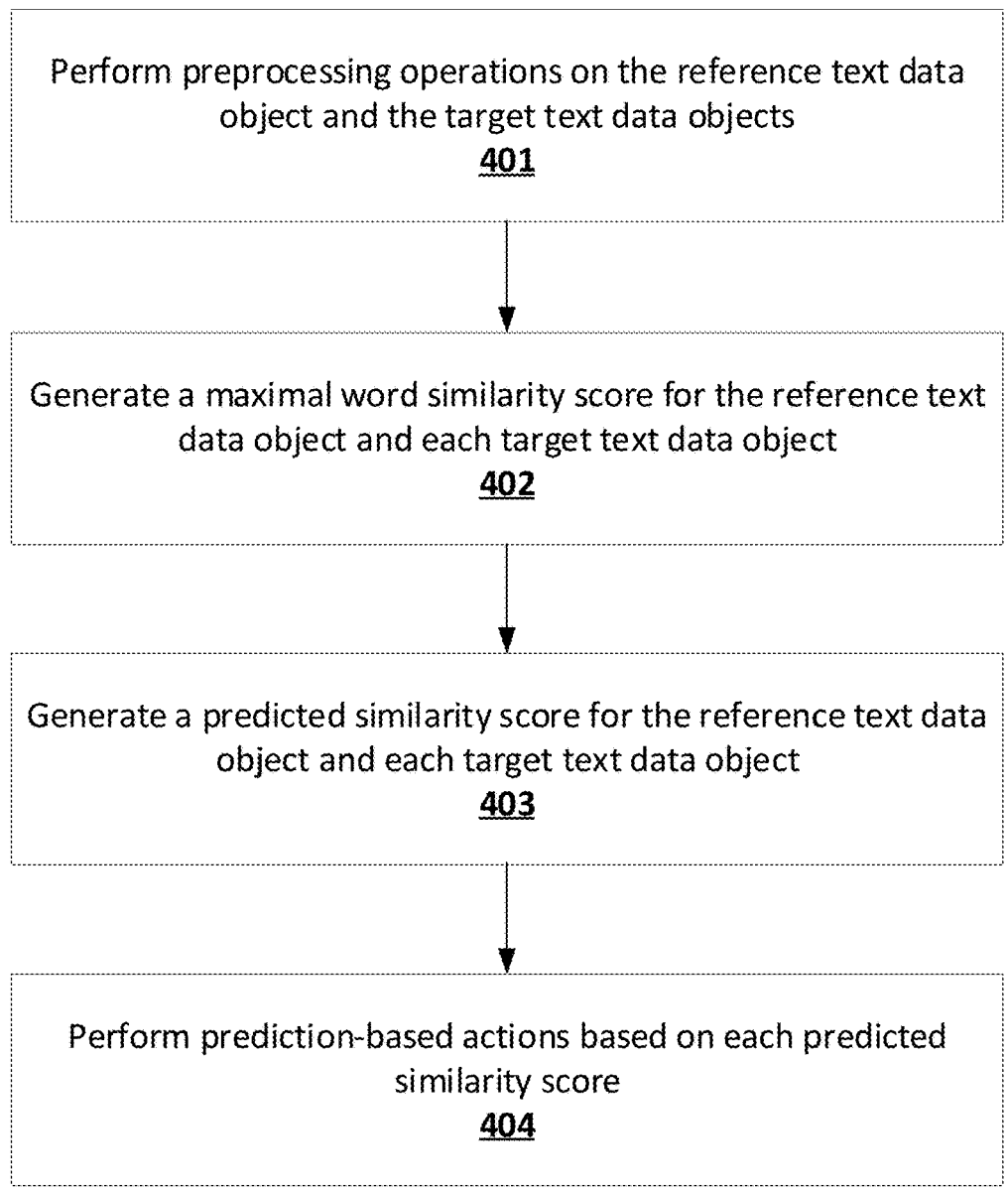

FIG. 4 is a flowchart diagram of an example process for generating a ranked similarity list for a set of target text data objects with respect to a reference text data object in accordance with some embodiments discussed herein.

Figure 5:
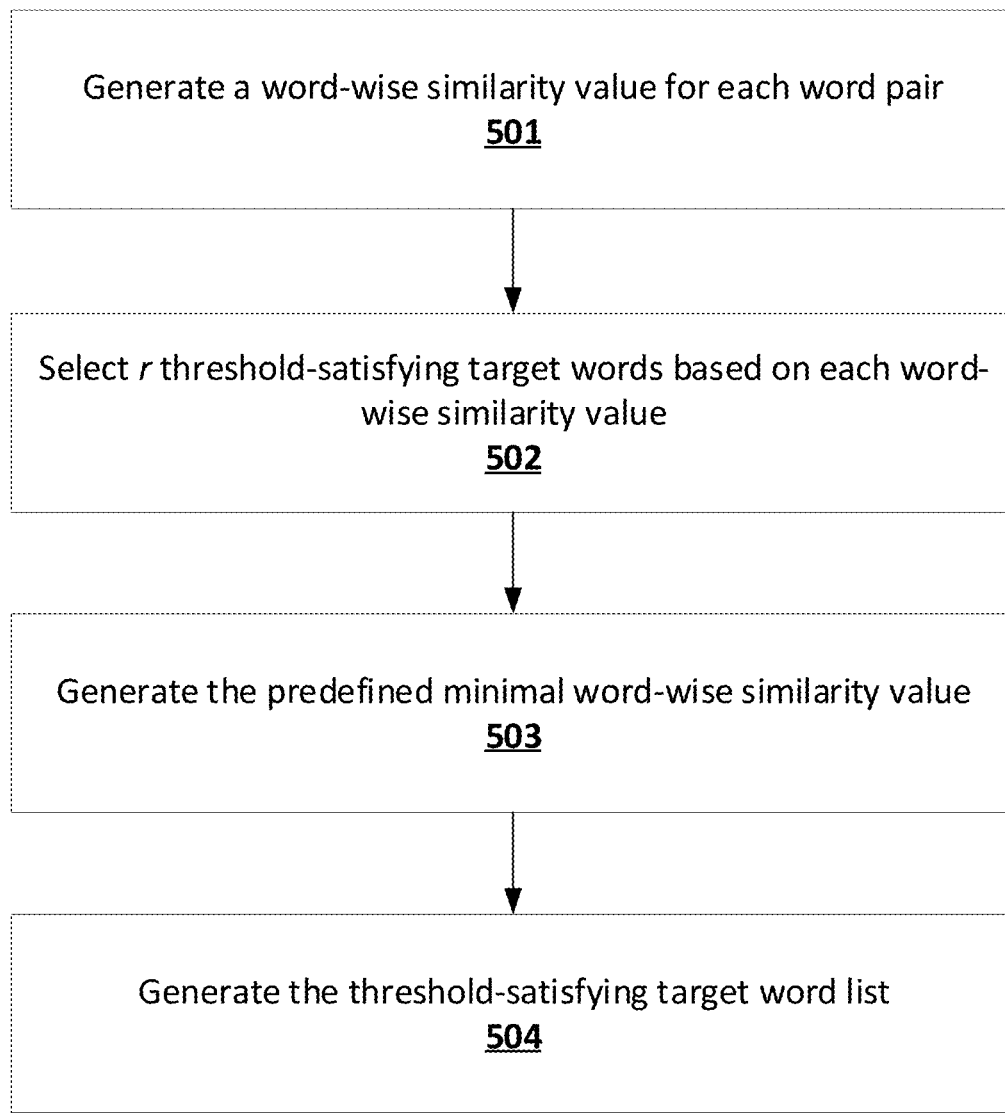

FIG. 5 is a flowchart diagram of an example process for generating a threshold-satisfying target word list and a predefined minimal word-wise similarity value for a reference word in accordance with some embodiments discussed herein.

FIG. 6 provides an operational example of generating a Word Mover's Similarity measure in accordance with some embodiments discussed herein.

Figure 8:
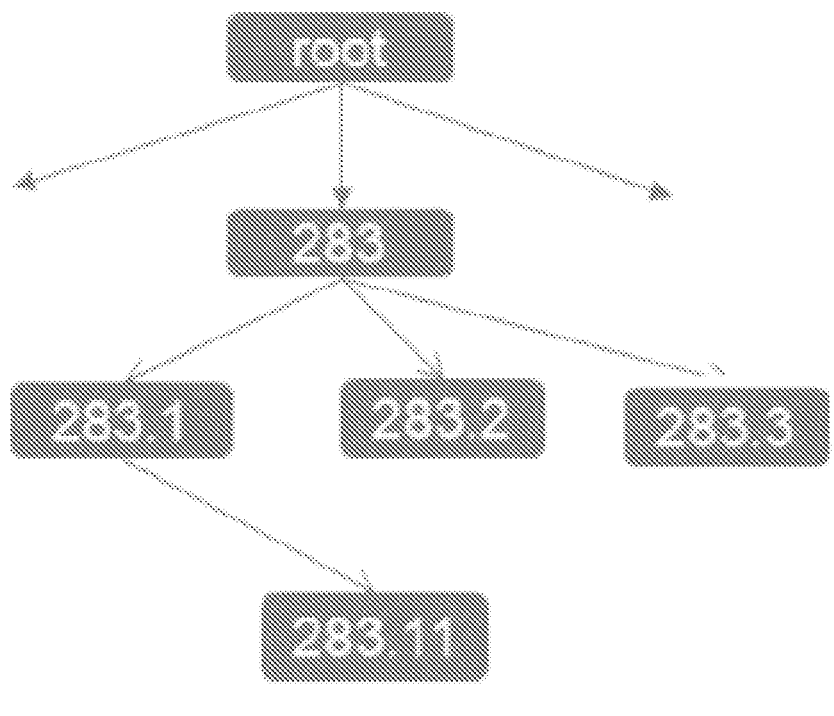

FIG. 7 provides an operational example of a prediction output user interface and FIG. 8 provides an example of a code hierarchy in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present invention introduce techniques for text comparison that reduce computational complexity of performing text comparison tasks in a manner that enables performing fast listwise text comparison. One particular problem that is addressed by various embodiments of the present invention concerns comparing a set of target text data objects to a reference text data object (e.g., a set of medical diagnosis code descriptions to a clinical note document) in order to determine a ranked list of target text data objects that relate to the reference text data object. This computational problem is complicated by the fact that, in some existing natural language processing frameworks, it requires a substantial number of computationally expensive document comparison actions, a feature that undermines the ability of various existing natural language processing frameworks in performing fast text comparison given a list of target text data objects that are configured to be compared to a reference text data objects.

Various embodiments of the present invention address the above-noted challenges associated with performing fast list-wise text comparison by utilizing a Word Mover's Similarity measure which measures the predicted similarity score for a reference text data object and a target text data object using a maximal word similarity score for the reference text data object and the target text data object, wherein: (i) the maximal word similarity score describes a maximal value of a transition cost value associated with one or more reference words of the reference text data object and one or more target words of the target data object, and (ii) the transition cost value is determined based at least in part on: (a) a word-wise flow data object for the reference text data object and the target text data object that describes, for each word pair comprising a reference word and a target word, a word-wise flow value, and (b) for each word pair, a word-wise similarity value. In some embodiments, maximizing the transition cost value is performed in accordance with a first maximization constraint requiring that a sum of each word-wise flow value for a particular reference word of the one or more reference words is equal to a document-wide word weight value for the particular reference word in the reference text data object, and a second maximization constraint requiring that a sum of each word-wise flow value for a particular target word of the one or more target words is equal to a document-wide word weight value for the particular target word in the target text data object. By framing the list-wise text similarity determination problem as a maximization problem, the Word Mover's Similarity measure can provide a text similarity measure that is more efficient than the state of the art systems, thus increasing efficiency of performing list-wise text similarity determination relative to existing natural language processing solutions and providing efficient and reliable solutions for performing list-wise text similarity determination.

Various embodiments of the present invention address the above-noted challenges associated with performing fast list-wise text comparison by utilizing a Relaxed Word Mover's Similarity measure which measures predicted similarity score for a reference text data object and a target text data object using a maximal word similarity score for the reference text data object and the target text data object, wherein: (i) the maximal word similarity score describes a maximal value of a transition cost value associated with one or more reference words of the reference text data object and one or more target words of the target data object, and (ii) the transition cost value is determined based at least in part on: (a) a word-wise flow data object for the reference text data object and the target text data object that describes, for each word pair comprising a reference word and a target word, a word-wise flow value, and (b) for each word pair, a word-wise similarity value. In some embodiments, maximizing the transition cost value is performed in accordance with a maximization constraint requiring that a sum of each word-wise flow value for a particular reference word of the one or more reference words is equal to a document-wide word weight value for the particular reference word in the reference text data object. In some embodiments, the document-wide word weight value is determined based at least in part on: (i) a term frequency inverse document frequency value of the particular target word in the target text data object, and (ii) a sum of each term frequency-inverse document frequency value for the one or more target words in the target text data object. By framing the list-wise text similarity determination problem as a maximization problem, the Relaxed Word Mover's Similarity measure can provide a text similarity measure that is more efficient than the state of the art systems as well as the Word Mover's Similarity measure in terms of time and storage requirements, thus increasing efficiency of performing list-wise text similarity determination relative to existing natural language processing solutions and providing efficient and reliable solutions for performing the problem of list-wise text similarity determination.

Various embodiments of the present invention address the above-noted challenges associated with performing fast list-wise text comparison by utilizing a Related Relaxed Word Mover's Similarity measure which measures predicted similarity score for a reference text data object and a target text data object using a maximal word similarity score for the reference text data object and the target text data object, wherein: (i) the maximal word similarity score describes a maximal value of a transition cost value associated with one or more reference words of the reference text data object and one or more target words of the target data object, and (ii) the transition cost value is determined based at least in part on: (a) a word-wise flow data object for the reference text data object and the target text data object that describes, for each word pair comprising a reference word and a target word, a word-wise flow value, and (b) for each word pair, a word-wise similarity value. In some embodiments, in accordance with the techniques related to perform Related Relaxed Word Mover's Similarity measure determination, determining each word-wise similarity value that is associated with a particular reference word and a particular target word comprises determining whether the particular target word is in a threshold-satisfying target word list for the particular target word; and in response to determining that the particular target word is not in the threshold-satisfying target word list, determining the word-wise similarity value based at least in part on a predefined minimal word-wise similarity value. By framing the list-wise text similarity determination problem as a maximization problem, the Related Relaxed Word Mover's Similarity measure can provide a text similarity measure that is more efficient than the state of the art systems as well as the Word Mover's Similarity measure and the Relaxed Word Mover's Similarity measure, thus increasing efficiency of performing list-wise text similarity determination relative to existing natural language processing solutions and providing efficient and reliable solutions for performing the problem of list-wise text similarity determination.

An exemplary application of various embodiments of the present invention relates to performing International Disease Code (ICD) code assignment. Accordingly, various embodiments of the present invention relate to assigning ICD codes to clinical texts. For classifying diseases, a hierarchy of diagnostic coding is provided by the ICD, and these diagnostic codes are known as ICD codes. Medical coding is a mandatory process for medical care and patient billing. Through this process, a coder assigns a set of ICD codes to a patient visit, a discharge summary, and the like. Manual coding can be tedious, subjective, time consuming, error-prone, and expensive.

One aspect of the various embodiments of the present invention relates to assigning ICD codes to clinical texts by finding the similarity value between the clinical text and an ICD code. Other aspects rank the ICD codes against the clinical text by comparing the similarity values between the text and the codes in a listwise fashion, and compute similarity between two texts using the concept of Word Mover's Distance (WMD), a technique that to the best of the inventors' knowledge is innovative and has not been done before. WMD may be used to formulate a distance function between text documents. Aspects of various embodiments of the present invention reverse the formulation of WMD distance measure by finding the maximum amount of similarity that the embedded words of one document need to travel to the embedded words of another document, and use this maximum amount of similarity to compute the similarity between the two noted documents.

In some embodiments, various embodiments of the present invention assume each word in the two texts is represented as a fixed dimensional embedded vector. In some embodiments, various embodiments of the present invention move the words of ICD text of an ICD code to the words of the clinical text in such a way such that the mass of a word (e.g., as determined based at least in part on the term-frequency-inverse-document-frequency (TF-IDF of the word) gets distributed over the words in the clinical text in a manner that maximizes the similarity between the clinical text and the ICD text in question. This can be posed as an optimization problem, referred to herein as the Word Mover's Similarity problem.

II. DEFINITIONS

The term "text data object" may refer to a data entity that is configured to describe any collection of text data. Examples of text data objects include reference text data objects and target text data objects. In some embodiments, a set of candidate target text data objects are processed to determine a set of n most similar target text data objects to a reference text data object in a descending order of similarity. For example, in some embodiments, the top n most similar diagnosis code descriptions for a medical note document (e.g., a discharge summary document) are ranked in a descending order of similarity of the n diagnosis code descriptions to the medical note document. Examples of reference text data objects include clinical texts and/or medical note documents. Examples of target text data objects include diagnosis code descriptions, such as hierarchical condition category (HCC) descriptions and/or International Classification of Diseases (ICD) code descriptions, such as ICD-10 code descriptions.

The term "threshold-satisfying target word list" may refer to a data entity that is configured to describe a list of r target words from a target word vocabulary (e.g., a set of all words appearing in a set of target text data objects) that are deemed to have a threshold-satisfying similarity with a corresponding reference word of a reference text. In some embodiments, the threshold-satisfying target word list for a corresponding reference word includes r target words from a target word vocabulary, where the r target words are the r words with the top word-wise similarity value with respect to the corresponding r word, and where each word-wise similarity value between the corresponding reference word and a target word exceeds a threshold word-wise similarity value, such as the threshold word-wise similarity value of 0.75. For example, given a reference word $w_i^d$ and a target word vocabulary $V_d = \{w_j^1, w_j^2, w_j^3, w_j^4\}$, if $s(w_i^d, w_j^1) = 0.85$ (the word-wise similarity value for $w_i^d$ and $w_j^1$ equals 0.85), $s(w_i^d, w_j^2) = 0.65$ (the word-wise similarity value for $w_i^d$ and $w_j^2$ equals 0.65), $s(w_i^d, w_j^3) = 0.95$ (the word-wise similarity value for $w_i^d$ and $w_j^3$ equals 0.95), and $s(w_i^d, w_j^4) = 0.78$ (the word-wise similarity value for $w_i^d$ and $w_j^4$ equals 0.76), and if r=2, then the threshold-satisfying target word list $w_i^d$ (denoted as $V_d(i)$) includes the following: $w_j^3$ and $w_j^1$. As another example, given a reference word $w_i^d$ and a target word vocabulary $V_d = \{w_j^1, w_j^2, w_j^3, w_j^4\}$, if $s(w_i^d, w_j^1) = 0.85$ (the word-wise similarity value for $w_i^d$ and $w_j^1$ equals 0.85), $s(w_i^d, w_j^2) = 0.65$ (the word-wise similarity value for $w_i^d$ and $w_j^2$ equals 0.65), $s(w_i^d, w_j^3) = 0.95$ (the word-wise similarity value for $w_i^d$ and $w_j^3$ equals 0.95), and $s(w_i^d, w_j^4) = 0.78$ (the word-wise similarity value for $w_i^d$ and $w_j^4$ equals 0.76), and if r=3, then the threshold-satisfying target word list $w_i^d$ (denoted as $V_d(i)$) includes the following: $w_j^3$, $w_j^1$, and $w_j^4$.

The term "predefined minimal word-wise similarity value" may refer to a data entity that is configured to describe a word-wise similarity value that may be assigned to any word pair that includes a corresponding reference word and a target word that is not listed in the threshold-satisfying target word list for the corresponding reference word. For example, given a reference word $w_i^d$ and a target word vocabulary $V_d = \{w_j^1, w_j^2, w_j^3, w_j^4\}$, if $s(w_i^d, w_j^1) = 0.85$ (the word-wise similarity value for $w_i^d$ and $w_j^1$ equals 0.85), $s(w_i^d, w_j^2) = 0.65$ (the word-wise similarity value for $w_i^d$ and $w_j^2$ equals 0.65), $s(w_i^d, w_j^3) = 0.95$ (the word-wise similarity value for $w_i^d$ and $w_j^3$ equals 0.95), and $s(w_i^d, w_j^4) = 0.78$ (the word-wise similarity value for $w_i^d$ and $w_j^4$ equals 0.76), and if r=2, then the predefined minimal word-wise similarity value $s_{\{min\}}$ may be assigned to $s(w_i^d, w_j^2)$ and $s(w_i^d, w_j^4)$. In some embodiments, the predefined minimal word-wise similarity value is a default value. In some embodiments, the predefined minimal word-wise similarity value is determined based at least in part on a statistical distribution measure (e.g., an average, a median, a mode, and/or the like) of the word-wise similarity values for the target words in the target vocabulary list that are not in the threshold word-wise similarity value for the corresponding reference word. For example, given a reference word $w_i^d$ and a target word vocabulary $V_d = \{w_j^1, w_j^2, w_j^3, w_j^4\}$, if $s(w_i^d, w_j^1) = 0.85$ (the word-wise similarity value for $w_i^d$ and $w_j^1$ equals 0.85), $s(w_i^d, w_j^2) = 0.65$ (the word-wise similarity value for $w_i^d$ and $w_j^2$ equals 0.65), $s(w_i^d, w_j^3) = 0.95$ (the word-wise similarity value for $w_i^d$ and $w_j^3$ equals 0.95), and $s(w_i^d, w_j^4) = 0.78$ (the word-wise similarity value for $w_i^d$ and $w_j^4$ equals 0.76), and if r=2, then the predefined minimal word-wise similarity value $s_{\{min\}}$ may be assigned to average($s(w_i^d, w_j^2)$, $s(w_i^d, w_j^4)$). In some embodiments, the predefined minimal word-wise similarity value is determined based at least in part on the minimal word-wise similarity value for the target words in the target vocabulary list that are in the threshold word-wise similarity value for the corresponding reference word. For example, given a reference word $w_i^d$ and a target word vocabulary $V_d = \{w_j^1, w_j^2, w_j^3, w_j^4\}$, if $s(w_i^d, w_j^1) = 0.85$ (the word-wise similarity value for $w_i^d$ and $w_j^1$ equals 0.85), $s(w_i^d, w_j^2)$=0.65 (the word-wise similarity value for $w_i^d$ and $w_j^2$ equals 0.65), $s(w_i^d, w_j^3)$=0.95 (the word-wise similarity value for $w_i^d$ and $w_j^3$ equals 0.95), and $s(w_i^d, w_j^4)$=0.78 (the word-wise similarity value for $w_i^d$ and $w_j^4$ equals 0.76), and if r=2, then the predefined minimal word-wise similarity value $s_{\{min\}}$ may be assigned to $\min(s(w_i^d, w_j^3), s(w_i^d, w_j^1))$.

The term "maximal word similarity score" may refer to a data entity that is configured to describe a measure of similarity of two text data objects (e.g., a reference text data object and a target text data object) that describes a maximum cost required to transform the words of a first text data object (e.g., target words of a target text data object) into words of a second text data object (e.g., reference words of a reference text data object). For example, the maximal word similarity score may describe a maximum cost required to transform the target words of a target text data object into reference words of a reference text data object using word-wise similarity measures between embedded representations of the reference words and the embedded representations of the target words. In some embodiments, the maximal word similarity score for a reference text data object and a target text data object describes a maximal value of a transition cost value associated with one or more reference words of the reference text data object and one or more target words of the target data object.

The term "transition cost value" may refer to a data entity that is configured to describe a measure of cost required to transform the words of a first text data object (e.g., target words of a target text data object) into words of a second text data object (e.g., reference words of a reference text data object). For example, the transition cost value may describe a cost required to transform the target words of a target text data object into reference words of a reference text data object using word-wise similarity measures between embedded representations of the reference words and the embedded representations of the target words. In some embodiments, the transition cost value for a reference text data object and a target text data object is determined based at least in part on: (i) a word-wise flow data object for the reference text data object and the target text data object that describes, for each word pair comprising a reference word and a target word, a word-wise flow value, and (ii) for each word pair, a word-wise similarity value.

The term "word-wise flow value" may refer to a data entity that is configured to describe a component of the document-wise word weight value for a word of a first text data object that is transitioned to a second word of a second text data object. For example, a word-wise flow value may describe a component of the document-wise word weight value for a reference word of a reference text data object that is transitioned to a target word of a target text data object. In some embodiments, the combination of all of the various word-wise flow values for reference words of a reference text data object and target words of a target text data object are described by a word-wise flow matrix for the reference text data object and the target text data object. In some embodiments, the sum of all word-wise flow values for a particular reference word is equal to a text-wide word weight value for the particular reference word in the reference text data object. In some embodiments, the sum of all word-wise flow values for a particular target word is equal to a text-wide word weight value for the target reference word in the target text data object.

The term "text-wide word weight value" may refer to a data entity that is configured to describe a frequency of a corresponding word in a particular text data object relative to the frequencies of other words in the particular text data object. For example, the text-wide weight value may describe a term frequency of a corresponding word in a particular text data object relative to the term frequencies of other words in the particular text data object. As another example, the text-wide weight value may describe a term-frequency-inverse-document-frequency measure of a corresponding word in a particular text data object relative to the term-frequency-inverse-document-frequency measures of other words in the particular text data object. In some embodiments, maximizing a transition cost value is performed in accordance with a maximization constraint requiring that a sum of each word-wise flow value for a particular reference word of the one or more reference words in a reference text data object is equal to a text-wide word weight value for the particular reference word in the reference text data object. In some embodiments, maximizing a transition cost value is performed in accordance with a maximization constraint requiring that a sum of each word-wise flow value for a particular target word of the one or more target words in a target text data object is equal to a text-wide word weight value for the particular target word in the target text data object.

The term "word-wise similarity value" may refer to a data entity that is configured to describe a value that describes a computed/assumed measure of similarity between two corresponding words. In some embodiments, the word-wise similarity value for a pair of words is determined based at least in part on a measure of similarity (e.g., a measure of cosine similarity) of the embedded representations (e.g., Word2Vec representations) of the noted words. In some embodiments, the word-wise similarity value for a pair of words is determined based at least in part on a predefined minimal word-wise similarity value, which may be a default value and/or a precomputed value. In some embodiments, the word-wise similarity value for a pair of words including a reference word and a target word is determined based at least in part on: (i) a measure of similarity (e.g., cosine similarity) of the embedded representations of the reference word and the target word if the measure of similarity satisfies a similarity measure threshold (e.g., exceeds a similarity measure threshold of 0.75), and (ii) a predefined minimal word-wise similarity value if the measure of similarity fails to satisfy a similarity measure threshold (e.g., fails to exceed a similarity measure threshold of 0.75).

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DEVIM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is a request for generating a list of target text data objects based at least in part on inferred similarities of the target text data objects to a reference text data object.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 702.11 (Wi-Fi), Wi-Fi Direct, 702.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

FIG. 4 is a flowchart diagram of an example process 400 for generating a ranked similarity list for a set of target text data objects with respect to a reference text data object. Via the various steps/operations of the process 400, the predictive data analysis computing entity 106 can perform listwise text similarity with reduced computational complexity.

A text data object may refer to any collection of text data. Examples of text data objects include reference text data objects and target text data objects. In some embodiments, a set of candidate target text data objects are processed to determine a set of n most similar target text data objects to a reference text data object in a descending order of similarity. For example, in some embodiments, the top n most similar diagnosis code descriptions for a medical note document (e.g., a discharge summary document) are ranked in a descending order of similarity of the n diagnosis code descriptions to the medical note document. Examples of reference text data objects include clinical texts and/or medical note documents. Examples of target text data objects include diagnosis code descriptions, such as hierarchical condition category (HCC) descriptions and/or International Classification of Diseases (ICD) code descriptions, such as ICD-10 code descriptions.

The process 400 begins at step/operation 401 when the predictive data analysis computing entity 106 performs preprocessing operations on the referenced text data object and the set of target text data objects. In some embodiments, the objective of the preprocessing operations include at least one of the following: (i) remove phrases indicating absences of particular conditions, (ii) generating reference words and target words based at least in part on the referenced text data object and the set of target text data objects respectively, and (iii) generating threshold-satisfying target word lists and a predefined minimal word-wise similarity value.

In some embodiments, because phrases indicating absences of particular conditions may complicate word-frequency-based text similarity determinations, such phrases are removed as part of the preprocessing operations. For example, in some embodiments, expressions such as "no swelling," "absence of fever," "not malignant," and/or the like removed. In some embodiments, such expressions are identified using a natural language processing model, such as using a dependency parser machine learning model and/or using a Bidirectional Encoder Representations from Transformers (BERT), where the natural language processing may be configured to identify windows of words indicating absences of conditions for subsequent removal as part of the preprocessing operations.

In some embodiments, preprocessing operations include generating reference words from a reference text data object and target words from a target text data object. A word, as used herein, may refer to any n-gram that is deemed to be a unit of frequency determination across a text data object. In some embodiments, the words extracted from a particular text data object include: (i) predefined n-grams that appear in the particular text data object, and (ii) unigrams other than stop words which do not appear in the predefined n-grams. For example, in some embodiments, the unigrams "malignant" and "tumor" are deemed to be occurring words of a text data object if they appear outside of the bigram "malignant tumor."

In some embodiments, preprocessing operations include generating, for each reference word, a threshold-satisfying target word list and a predefined minimal word-wise similarity value. A threshold-satisfying target word list may be a list of r target words from a target word vocabulary (e.g., a set of all words appearing in a set of target text data objects) that are deemed to have a threshold-satisfying similarity with a corresponding reference word of a reference text. In some embodiments, the threshold-satisfying target word list for a corresponding reference word includes r target words from a target word vocabulary, where the r target words are the r words with the top word-wise similarity value with respect to the corresponding r word, and where each word-wise similarity value between the corresponding reference word and a target word exceeds a threshold word-wise similarity value, such as the threshold word-wise similarity value of 0.75. For example, given a reference word $w_i^d$ and a target word vocabulary $V_d = \{w_j^1, w_j^2, w_j^3, w_j^4\}$, =0.85 (the word-wise similarity value for $w_i^d$ and $w_j^1$ equals 0.85), $s(w_i^d, w_j^2) = 0.65$ (the word-wise similarity value for $w_i^d$ and $w_j^2$ equals 0.65), $s(w_i^d, w_j^3) = 0.95$ (the word-wise similarity value for $w_i^d$ and $w_j^3$ equals 0.95), and $s(w_i^d, w_j^4) = 0.78$ (the word-wise similarity value for $w_i^d$ and $w_j^4$ equals 0.76), and if r=2, then the threshold-satisfying target word list $w_i^d$ (denoted as $V_d(0)$ includes the following: $w_j^3$ and $w_j^1$. As another example, given a reference word $w_i^d$ and a target word vocabulary $V_d = \{w_j^1, w_j^2, w_j^3, w_j^4\}$, if $s(w_i^d, w_j^1) = 0.85$ (the word-wise similarity value for $w_i^d$ and $w_j^1$ equals 0.85), $s(w_i^d, w_j^2) = 0.65$ (the word-wise similarity value for $w_i^d$ and $w_j^2$ equals 0.65), $s(w_i^d, w_j^3) = 0.95$ (the word-wise similarity value for $w_i^d$ and $w_j^3$ equals 0.95), and $s(w_i^d, w_j^4) = 0.78$ (the word-wise similarity value for $w_i^d$ and $w_j^4$ equals 0.76), and if r=3, then the threshold-satisfying target word list $w_i^d$ (denoted as $V_d(0)$ includes the following: $w_j^3$, $w_j^1$, and $w_j^4$.

A predefined minimal word-wise similarity value may describe a word-wise similarity value that may be assigned to any word pair that includes a corresponding reference word and a target word that is not listed in the threshold-satisfying target word list for the corresponding reference word. For example, given a reference word $w_i^d$ and a target word vocabulary $V_d = \{w_j^1, w_j^2, w_j^3, w_j^4\}$, if $s(w_i^d, w_j^1) = 0.85$ (the word-wise similarity value for $w_i^d$ and $w_j^1$ equals 0.85), $s(w_i^d, w_j^2) = 0.65$ (the word-wise similarity value for $w_i^d$ and $w_j^2$ equals 0.65), $s(w_i^d, w_j^3) = 0.95$ (the word-wise similarity value for $w_i^d$ and $w_j^3$ equals 0.95), and $s(w_i^d, w_j^4) = 0.78$ (the word-wise similarity value for $w_i^d$ and $w_j^4$ equals 0.76), and if r=2, then the predefined minimal word-wise similarity value $s_{\{min\}}$ may be assigned to $s(w_i^d, w_j^2)$ and $s(w_i^d, w_j^4)$.

In some embodiments, the predefined minimal word-wise similarity value is a default value. In some embodiments, the predefined minimal word-wise similarity value is determined based at least in part on a statistical distribution measure (e.g., an average, a median, a mode, and/or the like) of the word-wise similarity values for the target words in the target vocabulary list that are not in the threshold word-wise similarity value for the corresponding reference word. For example, given a reference word $w_i^d$ and a target word vocabulary $V_d = \{w_j^1, w_j^2, w_j^3, w_j^4\}$, if $s(w_i^d, w_j^1) = 0.85$ (the word-wise similarity value for $w_i^d$ and $w_j^1$ equals 0.85), $s(w_i^d, w_j^2) = 0.65$ (the word-wise similarity value for $w_i^d$ and $w_j^2$ equals 0.65), $s(w_i^d, w_j^3) = 0.95$ (the word-wise similarity value for $w_i^d$ and $w_j^3$ equals 0.95), and $s(w_i^d, w_j^4) = 0.78$ (the word-wise similarity value for $w_i^d$ and $w_j^4$ equals 0.76), and if r=2, then the predefined minimal word-wise similarity value $s_{\{min\}}$ may be assigned to average($s(w_i^d, w_j^2)$, $s(w_i^d, w_j^4)$). In some embodiments, the predefined minimal word-wise similarity value is determined based at least in part on the minimal word-wise similarity value for the target words in the target vocabulary list that are in the threshold word-wise similarity value for the corresponding reference word. For example, given a reference word $w_i^d$ and a target word vocabulary $V_d = \{w_j^1, w_j^2, w_j^3, w_j^4\}$, if $s(w_i^d, w_j^1) = 0.85$ (the word-wise similarity value for $w_i^d$ and $w_j^1$ equals 0.85), $s(w_i^d, w_j^2) = 0.65$ (the word-wise similarity value for $w_i^d$ and $w_j^2$ equals 0.65), $s(w_i^d, w_j^3) = 0.95$ (the word-wise similarity value for $w_i^d$ and $w_j^3$ equals 0.95), and $s(w_i^d, w_j^4) = 0.78$ (the word-wise similarity value for $w_i^d$ and $w_j^4$ equals 0.76), and if r=2, then the predefined minimal word-wise similarity value $s_{\{min\}}$ may be assigned to min($s(w_i^d, w_j^3)$, $s(w_i^d, w_j^1)$).

In some embodiments, step/operation 401 may be performed in accordance with the process that is depicted in FIG. 5, which is an example process of generating a threshold-satisfying target word list and a predefined minimal word-wise similarity value for a reference word $w_i^d$. The process that is depicted in FIG. 5 begins at step/operation 501 when the predictive data analysis computing entity 106 generates, for each word pair including $w_i^d$ and a reference word $w_j^l$ that appears in a set of target text data objects (where l=1, . . . , n and n is the number of target words that appear in the set of target text data objects), a word-wise similarity value $s(w_i^d, w_j^l)$. The predictive data analysis computing entity 106 further adds each $w_j^l$ along with the $s(w_i^d, w_j^l)$ for the $w_j^l$ to a list $L_i$.

At step/operation 502, the predictive data analysis computing entity 106 selects r words in the set of n target words that have a threshold-satisfying word-wise similarity value as indicated by $L_i$, where the r words may have top word-wise similarity values among the word-wise similarity values described by $L_i$. For example, the predictive data analysis computing entity 106 selects r words whose word-wise similarity values exceed 0.75. The predictive data analysis computing entity 106 further adds the selected r words, along with the word-wise similarity values for the selected r words, to a cache C. In some embodiments, selecting the r words is performed using a QuickSelect algorithm, which may enable performing the noted selection with linear computational complexity.

At step/operation 503, the predictive data analysis computing entity 106 generates the predefined minimal word-wise similarity value based at least in part on the set of target words that were not selected at step/operation 502. In some embodiments, the predictive data analysis computing entity 106 adds those target words that were not added to C to a global accumulator with A. The predictive data analysis computing entity 106 then computes the predefined minimal word-wise similarity value $s_{\{min\}}$ and assigns the predefined minimal word-wise similarity value to the set of target words that were not selected at step/operation 502. In some embodiments, the predictive data analysis computing entity 106 generates the $s_{\{min\}}$ based at least in part on the average of all word-wise similarity values added to A across all reference words $w_i^d$, where i=1, 2, . . . , n and n is the set of reference words that appear in the reference text data object.

At step/operation 504, the predictive data analysis computing entity 106 generates the threshold-satisfying target word list for the corresponding reference word based at least in part on the set of target words that were selected at step/operation 502. In some embodiments, the predictive data analysis computing entity 106 generates the threshold-satisfying target word list for the corresponding reference word based at least in part on the cache C. The cache C may include the threshold-satisfying target word lists for n reference words of the reference text data object and may require O(nr) spaces (where n is the number of reference words in the reference text data object and r is the number of selected words that are included as part of the threshold-satisfying target word list for each reference word). In some embodiments, construction of the cache C requires $O(n^2 b)$ operations, where b is the number of operations required to compute the word-wise similarity value between a pair of words (e.g., based at least in part on the embedded representations of the pair of words), and n is the number of reference words in the reference text data object.

Returning to FIG. 4, at step/operation 402, the predictive data analysis computing entity 106 generates a maximal word similarity score for the reference text data object and each target text data object. In some embodiments, the maximal word similarity score describes a maximal value of a transition cost value associated with one or more reference words of the reference text data object and one or more target words of the target data object. In some embodiments, the transition cost value is determined based at least in part on: (i) a word-wise flow data object for the reference text data object and the target text data object that describes, for each word pair comprising a reference word and a target word, a word-wise flow value, and (ii) for each word pair, a word-wise similarity value.

In some embodiments, the target text data object is selected from a plurality of candidate target text data objects. In some embodiments, the predictive data analysis computing entity 106 generates, for each candidate target text data object of the plurality of candidate target text data objects other than the target text data object, a candidate maximal word similarity score; and subsequently generates a ranked similarity list based at least in part on the maximal word similarity score and each candidate maximal word similarity score.

The maximal word similarity score may be a measure of similarity of two text data objects (e.g., a reference text data object and a target text data object) that describes a maximum cost required to transform the words of a first text data object (e.g., target words of a target text data object) into words of a second text data object (e.g., reference words of a reference text data object). For example, the maximal word similarity score may describe a maximum cost required to transform the target words of a target text data object into reference words of a reference text data object using word-wise similarity measures between embedded representations of the reference words and the embedded representations of the target words. In some embodiments, the maximal word similarity score for a reference text data object and a target text data object describes a maximal value of a transition cost value associated with one or more reference words of the reference text data object and one or more target words of the target data object.

A transition cost value may describe a measure of cost required to transform the words of a first text data object (e.g., target words of a target text data object) into words of a second text data object (e.g., reference words of a reference text data object). For example, the transition cost value may describe a cost required to transform the target words of a target text data object into reference words of a reference text data object using word-wise similarity measures between embedded representations of the reference words and the embedded representations of the target words. In some embodiments, the transition cost value for a reference text data object and a target text data object is determined based at least in part on: (i) a word-wise flow data object for the reference text data object and the target text data object that describes, for each word pair comprising a reference word and a target word, a word-wise flow value, and (ii) for each word pair, a word-wise similarity value.

A word-wise flow value may be a value that describes a component of the document-wise word weight value for a word of a first text data object that is transitioned to a second word of a second text data object. For example, a word-wise flow value may describe a component of the document-wise word weight value for a reference word of a reference text data object that is transitioned to a target word of a target text data object. In some embodiments, the combination of all of the various word-wise flow values for reference words of a reference text data object and target words of a target text data object are described by a word-wise flow matrix for the reference text data object and the target text data object. In some embodiments, the sum of all word-wise flow values for a particular reference word is equal to a text-wide word weight value for the particular reference word in the reference text data object. In some embodiments, the sum of all word-wise flow values for a particular target word is equal to a text-wide word weight value for the target reference word in the target text data object.

A text-wide word weight value may describe a frequency of a corresponding word in a particular text data object relative to the frequencies of other words in the particular text data object. For example, the text-wide weight value may describe a term frequency of a corresponding word in a particular text data object relative to the term frequencies of other words in the particular text data object. As another example, the text-wide weight value may describe a term-frequency-inverse-domain-frequency measure of a corresponding word in a particular text data object relative to the term-frequency-inverse-domain-frequency measures of other words in the particular text data object. In some embodiments, maximizing a transition cost value is performed in accordance with a maximization constraint requiring that a sum of each word-wise flow value for a particular reference word of the one or more reference words in a reference text data object is equal to a text-wide word weight value for the particular reference word in the reference text data object. In some embodiments, maximizing a transition cost value is performed in accordance with a maximization constraint requiring that a sum of each word-wise flow value for a particular target word of the one or more target words in a target text data object is equal to a text-wide word weight value for the particular target word in the target text data object.

A word-wise similarity value may be a value that describes a computed/assumed measure of similarity between two corresponding words. In some embodiments, the word-wise similarity value for a pair of words is determined based at least in part on a measure of similarity (e.g., a cosine similarity) of the embedded representations (e.g., Word2Vec representations) of the noted words. In some embodiments, the word-wise similarity value for a pair of words is determined based at least in part on a predefined minimal word-wise similarity value, which may be a default value and/or a precomputed value. In some embodiments, the word-wise similarity value for a pair of words including a reference word and a target word is determined based at least in part on: (i) a measure of similarity of the embedded representations of the reference word and the target word if the measure of similarity satisfies a similarity measure threshold (e.g., exceeds a similarity measure threshold of 0.75), and (ii) a predefined minimal word-wise similarity value if the measure of similarity fails to satisfy a similarity measure threshold (e.g., fails to exceed a similarity measure threshold of 0.75).

In some embodiments, the maximal word similarity score is a Word Mover's Similarity (WMS) measure. In some of the noted embodiments, the WMS measure for a reference text data object d and a target text data object g is determined by performing the operations of the below equation:

$$S^*_{dg} = sim(d, g) = \max \sum_{i=1}^{m} \sum_{j=1}^{n} t_{ij} s(i, j) \quad \text{Equation 1}$$

subject to:

$$\sum_{j=1}^{m} t_{ij} = f_i^d, i = 1, \ldots, m \quad (1)$$

$$\sum_{i=1}^{n} t_{ij} = f_j^g, j = 1, \ldots, n \quad (2)$$

In Equation 1: (i) $S^*_{dg}$ and sim(d, g) denote the WMS measure for d and g, (ii) iterates overt the m words of d, (iii) j iterates over the n words of g, (iv) $t_{ij}$ is the word-wise flow value for the ith word of d and jth word of g (which may be a non-negative value), (v) s(i,j) is the word-wise similarity value for the ith word of d and jth word of g computed through some natural measure like cosine similarity, (vi) $f_i^d$ is the text-wide word weight value for the ith word of d in relation to d, (vii) $f_j^g$ is the text-wide word weight value for the jth word of g in relation to g, (viii) $\max \Sigma_{i=1}^{m} \Sigma_{j=1}^{n} t_{ij} s(i,j)$ is the transition cost value, (ix) $\Sigma_{j=1}^{m} t_{ij} = f_i^d$, i=1, . . . , m is the maximization constraint requiring that a sum of each word-wise flow value for a particular reference word of the one or more reference words is equal to a document-wide word weight value for the particular reference word in the reference text data object, and (x) $\Sigma_{i=1}^{n} t_{ij} = f_i^g$, j=1, . . . , n is the maximization constraint requiring that a sum of each word-wise flow value for a particular target word of the one or more target words is equal to a document-wide word weight value for the particular target word in the target text data object.

$$f_w^k = \frac{tf(w, g_k)}{\sum_{w_t \in g_k} tf(w_t, g_k)}.$$

In some embodiments, in Equation 1, $f_i^d$ and $f_i^g$ are determined by performing the operations of the below equation for a word w of a text data object s:

$$f_w^s = \frac{tf(w, s)}{\sum_{w_o \in s} tf(w_o, s)} \quad \text{Equation 2}$$

In Equation 2, $f_w^s$ is the text-wise word weight value for the word w in the text data object s, tf (w, s) is the term frequency of the word w in the text data object s, and the summation in the denominator ranges over all words of s.

An operational example of generating a WMS measure for a reference text data object 601 and a target data object 602 is depicted in FIG. 6. As depicted in FIG. 6, the WMS measure is generated based at least in part on word-wise similarity values 603 and the text-wide word weight values 604, which are in turn used to generate the WMS measure based at least in part on the computations 605.

In some embodiments, the maximal word similarity score is a Relaxed WMS (RWMS) measure. In some embodiments, the RWMS measure for a reference text data object d and a target text data object g is determined by performing the operations of the below equation:

$$S^*_{dg} = sim(d, g) = \max \sum_{i=1}^{m} \sum_{j=1}^{n} t_{ij} s(i, j) \quad \text{Equation 3}$$

subject to:

$$\sum_{j=1}^{m} t_{ij} = f_i^d, i = 1, \ldots, m$$

In Equation 3: (i) $S^*_{dg}$ and sim(d, g) denote the RWMS measure for d and g, (ii) iterates overt the m words of d, (iii) j iterates over the n words of g, (iv) $t_{ij}$ is the word-wise flow value for the ith word of d and jth word of g (which may be a non-negative value), (v) s(i,j) is the word-wise similarity value for the ith word of d and jth word of g, (vi) $f_i^d$ is the text-wide word weight value for the ith word of d in relation to d, (vii) ET, $t_{ij}s(i, j)$ is the transition cost value, and (ix) $\Sigma_{j=1}^{m} t_{ij} = f_i^d$, i=1, . . . , m is the maximization constraint requiring that a sum of each word-wise flow value for a particular reference word of the one or more reference words is equal to a document-wide word weight value for the particular reference word in the reference text data object.

An operational example of generating a WMS measure for a reference text data object 601 and a target data object 602 is depicted in FIG. 6. As depicted in FIG. 6, the WMS measure is generated based at least in part on word-wise similarity values 603 and the text-wide word weight values 604, which are in turn used to generate the WMS measure based at least in part on the computations 605.

In some embodiments, in Equation 3, when g is selected from a set of candidate target text data objects C={$g_1$, $g_2$, . . . , $g_k$}, the text-wide word weight value for an ith word of a set of target words that occur in C (i.e., the word $w_i$ in relation to a selected text data object $g_l$ from C can be determined by performing the operations of the below equation:

$$f_i^{g_l} = \frac{TF - IDF(w_i, C, g_l)}{\sum_{g_p \in C} TF - IDF(, C, g_p)} \quad \text{Equation 4}$$

In Equation 4, $f_i^{g_l}$ is the text-wide word weight value for $w_i$ in relation to the text data object $g_l$ from C, TF-IDF($w_i$, C, $g_l$) is the term-frequency-inverse-document-frequency of $w_i$ in relation to the text data object $g_l$ and in relation to the domain C, and the summation in the denominator ranges over all the text data objects of C.

In some embodiments, determining each word-wise similarity value that is associated with a particular reference word and a particular target word comprises determining whether the particular target word is in a threshold-satisfying target word list for the particular target word; and, in response to determining that the particular target word is not in the threshold-satisfying target word list, determining the word-wise similarity value based at least in part on a predefined minimal word-wise similarity value. In some embodiments, the maximal word similarity score is a Related RWMS (RRWMS) measure. In some embodiments, the RRWMS for a reference text data object d and a target text data object g is determined by performing the operations of the below equation:

$$S^*_{dg} = sim(d, g) \max \sum_{j=1 \text{ and } W^g_j \in V_d(i)}^{n} t_{ij} s(w^d_i, w^g_j) + \sum_{j=1 \text{ and } W^g_j \in V_d \backslash V_d(i)}^{n} T_{ij} s_{\{min\}}$$

Equation 5 such that $$T_{ij} + \sum_{j=1 \text{ and } W^g_j \in V_d(i)}^{n} t_{ij} = f^d_i, i = 1, 2, \ldots, n$$

In Equation 5: (i) $S^*_{dg}$ and sim(d, g) denote the RRWMS measure for d and g, (ii) iterates overt the m words of d, (iii) j iterates over the n words of g, (iv) $t_{ij}$ is the word-wise flow value for the ith word of d and jth word of g (which may be a non-negative value), (v) $s(w^d_i, w^g_j)$ is the word-wise similarity value for the ith word of d and jth word of g, (vi) $f^d_i$ is the text-wide word weight value for the ith word of d in relation to d, (viii) $V_d(i)$ is the threshold-satisfying target word list for the ith word of d, (ix) $V_d$ is the set of all words that appear in d, and (x) $\max \Sigma_{j=1}^{n}{}_{\text{ and } w^g_j \in V_d(i)} t_{ij} s(w^d_i, w^g_j) + \Sigma_{j=1}^{n}{}_{\text{ and } w^g_j \in V_d/V_d(i)} T_{ij} s_{\{min\}}$ is the transition cost value.

In some embodiments, the plurality of candidate target text data objects are associated with a graph hierarchical structure, and generating the maximal word similarity score and each candidate maximal word similarity score comprises traversing the graph hierarchical structure in accordance with a set of breadth first search iterations to identify the plurality of candidate target text data objects. In some embodiments, the breadth first search iterations cause target text data objects (e.g., corresponding to diagnosis codes) occurring at a particular hierarchical level of a hierarchical structure to be eliminated on the basis of their maximal word similarity scores. In some embodiments, one traversal at a particular level is done using a previous breadth first search iteration, then same rule is applied for subsequent levels. In some embodiments, in a situation where a target text data object been identified at every level, then the target text data object which is closet to parent node will be selected only. In some embodiments, performing the breadth first search iterations involve performing operations of the below Algorithm 1.

Algorithm 1

Input: A graph G and a starting vertex root of G(here code 283) and nodes with their similarity score
Output: A dictionary D with code as key and Similarity score as Value.
procedure BFS(G, root) is
   let Q be a queue and a dictionary D is defined.
   label root as discovered
   Q.enqueue(root)
   while Q is not empty do
     v := Q.dequeue( )
     if v is the goal then
       assign v as key and similarity as value in Dictionary D.
       return D
     for all edges from v to w in G.adjacentEdges(v) do
       Find Node G.adjacentEdges(v) with max sim as max(Node
       G.adjacentEdges(v)) and insert in Dict D.
       if w is not labeled as discovered then
         label w as discovered In some embodiments, ICD codes are arranged in a tree hierarchy in which each vertex (or node) of the tree is an ICD code. The tree may be a rooted tree in which one particular vertex (a null ICD code) is designated to be the root node of the tree. The height of a node may be determined based on closeness of the node to the root node. The height of a node is also known as the level of ICD code representing the node. For instance in the Code Hierarchy 1 as depicted in FIG. 8, code 283 may be deemed to be at level 0, codes 283.1, 283.2 and 283.3 may be deemed to be at level 1, and code 283.11 may be deemed at level at 2. Any code that is connected with a root node starts a family of codes. For example, code 283 starts a family of codes that all start with the 283 prefix. In the ICD tree hierarchy, a proposed system can define natural relations on the nodes such as parent-child relationships (e.g., the relationship between the node corresponding to 283 and the node corresponding to 283.1) and/or sibling relationships (e.g., the relationship between the node corresponding to 283.1 and the node corresponding to 283.2).

In some embodiments, ICD coding accuracy can be improved by exploiting the structure of the tree hierarchy described above. For example, if a code P has codes A and B as its children, then it may be deemed highly unlikely that both A and B will be assigned to a patient simultaneously. However, absent using the tree-based inferences described herein, if the similarity between ICD codes A and B in the code tree is significant, then subsequent to assignment of A, B is likely to be assigned. A proposed system may avoid this outcome by ensuring that, among a set of codes that are siblings, only one having the highest degree of similarity to a reference text data object is assigned to the reference text data object. The sibling relationships defined by the tree hierarchy as well as other significant relationships defined by the tree hierarchy may be detected using a tree traversal routine employing the Breadth First Search (BFS) traversal method. An example of such a tree traversal routine is Algorithm 2 depicted below, in which adjacentEdges(v) denote the set of vertices in the ICD code tree that share a child relationship with the vertex v in the tree.

Algorithm 2

Input : ICD code tree G = (V, E) where V and E are the set of vertices and edges.
       A starting vertex root node r of G, A Discharge Diagnosis (DD) d, Two
       Dictionaries D and Δ
Output : A list of selected ICD codes with their similarity values
        {($t_i$, $s_i$) : $t_i$ ∈ V, $s_i$ is the similarity value of $t_i$ wrt d}
ModifiedBFS (G, r, d, D)
Initialization : D ← ∅, Δ = ∅, a Queue Q is initialized as empty
label root r as discovered;
Q · enqueue(r);
while Q is not empty do
 | v := Q.dequeue( );
 | for all edges from v to w in G.adjacentEdges(v) do
 |  | Find Node u = G.adjacentEdges(u) such that
 |  |   u = argmax$_{\{w\}}$ {aug-WMS(d, w) | w ∈ adjacentEdges(v)};
 |  | insert u as key and s (= aug-WMS(d, u)) as value in Dictionary D;
 |  | if w is not labeled as discovered then
 |  |  | label w as discovered ;
 |  |  | Q.enqueue(w);
 |  | else
 |  | end
 | end
end
return D;
for all keys w in D do
 | compute $s_w$ = aug-WMS(r, w)
end
sort {$s_w$ : w in D} in descending order to obtain $s_{w(1)}$, $s_{w(2)}$, . . . and corresponding
  vertices. w(1), w(2), . . . , etc.;
choose only first k values and set Δ = {(w(1), $s_1$), (w(2), $s_2$), . . . , (w(k), $s_k$)} such
  that (w(i), $s_i$) ∈ D, 1 ≤ i ≤ k;
return Δ;

Accordingly, in some embodiments, the target text data object is selected from a plurality of candidate target text data objects, the plurality of candidate target text data objects are associated with a graph hierarchical structure (e.g., the tree structure associated with the ICD codes for the target text data objects), and generating the predicted similarity score maximal word similarity score and each candidate maximal word similarity score comprises: generating a raw predicted similarity score for the target text data object based at least in part on the maximal word similarity score, traversing the graph hierarchical structure in accordance with a set of breadth first search iterations to determine one or more sibling relationships for the target text data object (e.g., where a sibling relationship is one in which a graph hierarchical structure node associated with the target text data object is deemed to have a sibling relationship with a graph hierarchical structure node associated with a second target text data object of the plurality of target text data objects, and assigning a zero-valued predicted similarity score to the target text data object if at least one of the one or more sibling relationship is associated with a second target text data object that has a second raw predicted similarity score that exceeds the raw predicted similarity score of the target text data object (e.g., if at least one sibling of the target text data object is deemed to have a higher similarity degree with respect to the reference text data object).

At step/operation 403, the predictive data analysis computing entity 106 generates a predicted similarity score for each target text data object in relation to the reference text data object based at least in part on the maximal word similarity score for the target text data object and the reference text data object. In some embodiments, the predictive data analysis computing entity 106 adopts the maximal word similarity score as the predicted similarity score. In some embodiments, the predictive data analysis computing entity 106 makes one or more modifications on the maximal word similarity score to generate the predicted similarity score.

At step/operation 404, the predictive data analysis computing entity 106 performs one or more prediction-based actions operations. In some embodiments, performing the one or more prediction-based actions comprises generating user interface data for a prediction output user interface that depicts, for each reference text data object of a list of reference text data objects, a ranked list of identifiers for target text data objects that relate to the reference text data object in a descending order of predicted similarity score.

For example, as depicted in FIG. 7, the prediction output user interface 700 depicts that: the most similar target text data object to the reference text data object 701 is associated with the medical diagnosis code 5160, the second most similar target text data object to the reference text data object 701 is associated with the medical diagnosis code 3485, the third most similar target text data object to the reference text data object 701 is associated with the medical diagnosis code 51851, the fourth most similar target text data object to the reference text data object 701 is associated with the medical diagnosis code 486, the fifth most similar target text data object to the reference text data object 701 is associated with the medical diagnosis code 34510, the sixth most similar target text data object to the reference text data object 701 is associated with the medical diagnosis code V641, and the seventh most similar target text data object to the reference text data object 701 is associated with the medical code 2767.

As another example, as further depicted in FIG. 7, the prediction output user interface 700 depicts that: the most similar target text data object to the reference text data object 702 is associated with the medical diagnosis code 53021, the second most similar target text data object to the reference text data object 702 is associated with the medical diagnosis code 27651, the third most similar target text data object to the reference text data object 702 is associated with the medical diagnosis code 311, the fourth most similar target text data object to the reference text data object 702 is associated with the medical diagnosis code 30301, and the fifth most similar target text data object to the reference text data object 702 is associated with the medical diagnosis code 29570.

For example, the set of m target text data objects may relate to the following ICD-10 codes: Malignant neoplasm of fundus of stomach (C16.1), Malignant neoplasm of body of stomach (C16.2), Malignant neoplasm of lesser curvature of stomach, unspecified (C16.5), neoplasm of greater curvature of stomach, unspecified (C16.6), Malignant neoplasm of overlapping sites of stomach (C16.8). In this example, the predictive data analysis computing entity 106 may select the common words in these codes (malignant, neoplasm, and stomach) and only keep the word which is associated with human anatomy, i.e., stomach. Then the predictive data analysis computing entity 106 may find the window of words (both to the right and left) of the human anatomy word in each of the codes. Then, the predictive data analysis computing entity 106 may run the WMS algorithm with each phrase containing the word stomach with respect to the reference text data object, and see if the maximum similarity exceeds 0.5. If not, the predictive data analysis computing entity 106 may associate the code Malignant neoplasm of stomach, unspecified (C16.9) with the reference text data object.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, using one or more processors, a maximal word similarity score for a reference text data object and a target text data object, wherein: (i) the maximal word similarity score describes a maximal value of a transition cost value indicative of a measure of cost to transform a first embedded representation associated with one or more target words of the target text data object into a second embedded representation associated with one or more reference words of the reference text data object, and (ii) the transition cost value is determined based at least in part on, for each word pair comprising a reference word and a target word, a word-wise flow value and, a word-wise similarity value;
generating, using the one or more processors, a predicted similarity score for the reference text data object and the target text data object based at least in part on the maximal word similarity score; and
initiating, using the one or more processors, the performance of one or more prediction-based actions based at least in part on the predicted similarity score.

2. The computer-implemented method of claim 1, wherein maximizing the transition cost value is performed in accordance with a maximization constraint requiring that a sum of each word-wise flow value for a particular reference word of the one or more reference words is equal to a document-wide word weight value for the particular reference word in the reference text data object.

3. The computer-implemented method of claim 2, wherein the document-wide word weight value is determined based at least in part on: (i) a term frequency value of the particular reference word in the reference text data object, and (ii) a sum of each term frequency value for the one or more reference words in the reference text data object.

4. The computer-implemented method of claim 1, wherein maximizing the transition cost value is performed in accordance with a maximization constraint requiring that a sum of each word-wise flow value for a particular target word of the one or more target words is equal to a document-wide word weight value for the particular target word in the target text data object.

5. The computer-implemented method of claim 4, wherein the document-wide word weight value is determined based at least in part on: (i) a term frequency value of the particular target word in the target text data object, and (ii) a sum of each term frequency value for the one or more target words in the target text data object.

6. The computer-implemented method of claim 1, wherein:
the target text data object is selected from a plurality of candidate target text data objects, and
the computer-implemented method comprises:
generating, using the one or more processors and for each candidate target text data object of the plurality of candidate target text data objects other than the target text data object, a candidate maximal word similarity score; and
generating, using the one or more processors, a ranked similarity list based at least in part on the maximal word similarity score and each candidate maximal word similarity score.

7. The computer-implemented method of claim 6, wherein maximizing the transition cost value is performed in accordance with a maximization constraint requiring that a sum of each word-wise flow value for a particular target word of the one or more target words is equal to a document-wide word weight value for the particular target word in the target text data object.

8. The computer-implemented method of claim 7, wherein the document-wide word weight value is determined based at least in part on: (i) a term frequency value of the particular target word in the target text data object, and (ii) a sum of each term frequency value for the one or more target words in the target text data object.

9. The computer-implemented method of claim 1, wherein:
the target text data object is selected from a plurality of candidate target text data objects,
the plurality of candidate target text data objects are associated with a graph hierarchical structure, and
generating the predicted similarity score comprises:
generating a raw predicted similarity score for the target text data object based at least in part on the maximal word similarity score,
traversing the graph hierarchical structure in accordance with a set of breadth first search iterations to identify to determine one or more sibling relationships for the target text data object, wherein each sibling relationship is associated with a second target text data object of the plurality of candidate target text data objects, and assigning a zero-valued predicted similarity score to the target text data object if at least one of the one or more sibling relationships is associated with a second target text data object that has a second raw predicted similarity score that exceeds the raw predicted similarity score of the target text data object.

10. The computer-implemented method of claim 1, wherein determining each word-wise similarity value that is associated with a particular reference word and a particular target word comprises:

determining whether the particular target word is in a threshold-satisfying target word list for the particular target word; and in response to determining that the particular target word is not in the threshold-satisfying target word list, determining the word-wise similarity value based at least in part on a predefined minimal word-wise similarity value.

11. A computing system comprising one or more processors and at least one memory including program code, the at least one memory and the program code configured to, with the one or more processors, cause the computing system to at least:

generate a maximal word similarity score for a reference text data object and a target text data object, wherein: (i) the maximal word similarity score describes a maximal value of a transition cost value indicative of a measure of cost to transform a first embedded representation associated with one or more target words of the target text data object into a second embedded representation associated with one or more reference words of the reference text data object, and (ii) the transition cost value is determined based at least in part on, for each word pair comprising a reference word and a target word, a word-wise flow value and a word-wise similarity value;

generate a predicted similarity score for the reference text data object and the target text data object based at least in part on the maximal word similarity score; and initiate the performance of one or more prediction-based actions based at least in part on the predicted similarity score.

12. The computing system of claim 11, wherein maximizing the transition cost value is performed in accordance with a maximization constraint requiring that a sum of each word-wise flow value for a particular reference word of the one or more reference words is equal to a document-wide word weight value for the particular reference word in the reference text data object.

13. The computing system of claim 12, wherein the document-wide word weight value is determined based at least in part on: (i) a term frequency value of the particular reference word in the reference text data object, and (ii) a sum of each term frequency value for the one or more reference words in the reference text data object.

14. The computing system of claim 11, wherein maximizing the transition cost value is performed in accordance with a maximization constraint requiring that a sum of each word-wise flow value for a particular target word of the one or more target words is equal to a document-wide word weight value for the particular target word in the target text data object.

15. The computing system of claim 14, wherein the document-wide word weight value is determined based at least in part on: (i) a term frequency value of the particular target word in the target text data object, and (ii) a sum of each term frequency value for the one or more target words in the target text data object.

16. One or more non-transitory computer-readable storage media including instructions that, when executed by one or more processors, cause the one or more processors to:

generate a maximal word similarity score for a reference text data object and a target text data object, wherein: (i) the maximal word similarity score describes a maximal value of a transition cost value indicative of a measure of cost to transform a first embedded representation associated with one or more target words of the target text data object into a second embedded representation associated with one or more reference words of the reference text data object, and (ii) the transition cost value is determined based at least in part on, for each word pair comprising a reference word and a target word, a word-wise flow value and a word-wise similarity value;

generate predicted similarity score for the reference text data object and the target text data object based at least in part on the maximal word similarity score; and initiate the performance of perform one or more prediction-based actions based at least in part on the predicted similarity score.

17. The one or more non-transitory computer-readable storage media of claim 16, wherein maximizing the transition cost value is performed in accordance with a maximization constraint requiring that a sum of each word-wise flow value for a particular reference word of the one or more reference words is equal to a document-wide word weight value for the particular reference word in the reference text data object.

18. The one or more non-transitory computer-readable storage media of claim 17, wherein the document-wide word weight value is determined based at least in part on: (i) a term frequency value of the particular reference word in the reference text data object, and (ii) a sum of each term frequency value for the one or more reference words in the reference text data object.

19. The one or more non-transitory computer-readable storage media of claim 16, wherein maximizing the transition cost value is performed in accordance with a maximization constraint requiring that a sum of each word-wise flow value for a particular target word of the one or more target words is equal to a document-wide word weight value for the particular target word in the target text data object.

20. The one or more non-transitory computer-readable storage media of claim 19, wherein the document-wide word weight value is determined based at least in part on: (i) a term frequency value of the particular target word in the target text data object, and (ii) a sum of each term frequency value for the one or more target words in the target text data object.

* * * * *

UNITED STATES PATENT AND TRADEMARK OFFICE
CERTIFICATE OF CORRECTION

PATENT NO. : 11,941,357 B2
APPLICATION NO. : 17/355731
DATED : March 26, 2024
INVENTOR(S) : Suman Roy et al.

It is certified that error appears in the above-identified patent and that said Letters Patent is hereby corrected as shown below:

In the Claims

In Column 27, Line 57, Claim 1, delete "and," and insert -- and --, therefor.

Signed and Sealed this
Nineteenth Day of November, 2024

Katherine Kelly Vidal
*Director of the United States Patent and Trademark Office*